United States Patent Office 2,888,368
Patented May 26, 1959

2,888,368

NITROCELLULOSE TYPE COATINGS FOR CELLULOSIC BASE FILMS

William G. Grantham, Wilmington, Del., assignor to American Viscose Corporation, Philadelphia, Pa., a corporation of Delaware No Drawing. Application December 27, 1954
Serial No. 477,923

6 Claims. (Cl. 117—145)

This invention relates to new and useful coating compositions, and more particularly to moistureproof, heat-sealable nitrocellulose coatings and articles coated therewith.

Coating compositions wherein nitrocellulose is the principal film-former are made moistureproof by the addition thereto of a small quantity of wax or wax-like substance. Waxes, however, are not sufficiently compatible with nitrocellulose. Therefore, a blending agent such as ester gum must be incorporated in the coating along with the wax. Moistureproof compositions containing nitrocellulose, wax and a blending agent are not thermoplastic. A plasticizer or a mixture of plasticizers compatible with the other materials, therefore, are added to make the coating more flexible and also thermoplastic or heat-sealing. The plasticizers may be resinous (high molecular weight) materials as well as chemical (low molecular weight) compounds.

As a result of the softening action of the plasticizer the above described coatings of nitrocellulose tend to block, i.e., form a laminate which is difficult to separate into its component layers when a number of coated sheets are superimposed and pressure applied. Various materials such as talc and bentonite have been proposed as antiblocking agents. Another difficulty is that when sufficient thermoplasticity is obtained there is a tendency to stick to the heated surfaces between which two or more layers of coated sheets are pressed to cause a heat seal.

The object of the present invention is to manufacture flexible, moistureproof coated cellulosic pellicles which are heated sealable and readily released from heated surfaces employed in a heat sealing process. Another object is to provide such coated articles which are both non-blocking and heat-sealable.

It has now been discovered that the above objects are accomplished by employing tri-2-ethylhexyl phosphate as one of the plasticizers in a moistureproof nitrocellulose coating, particularly when accompanied by a small quantity of a styrene-butadiene copolymer containing from about 80 to 90% by weight of styrene.

Tri-2-ethylhexyl phosphate is a relatively non-volatile liquid having a specific gravity of 0.926 at 20° C. The compound has a molecular weight of 435 and is insoluble in water. This compound is used as part of the mixture of plasticizers in moistureproof nitrocellulose coatings. In general, such coatings comprise from about 35% to 60% by weight of nitrocellulose, from about 2% to 10% by weight of a wax or wax-like substance, from about 2% to about 10% by weight of a blending agent and from about 10% to about 50% by weight of plasticizing materials. It is preferred that tri-2-ethylhexyl phosphate constitutes from about 15% to 40% by weight of the plasticizing materials (2% to 20% of the total weight) in the coating composition.

The styrene-butadiene copolymers containing from about 80% to 90% by weight of styrene contemplated in the present invention may be prepared by emulsion copolymerization at temperatures from 45° C. to 60° C. under super-atmospheric pressure and in the presence of a catalyst. In order that the copolymer can be readily incorporated into typical nitrocellulose coating compositions and in lacquers thereof, it is preferred that the polymerization reaction be carried out to the extent that the product is soluble in aromatic hydrocarbons, such as benzene and toluene, and esters such as butyl and ethyl acetate. From about 0.2% to about 2% by weight of the copolymer in the coating is effective to prevent blocking and insure ready release from heat sealing surfaces.

As stated hereinabove, tri-2-ethylhexyl phosphate is used in combination with other plasticizers of either the resinous or chemical type. Examples of such plasticizers are phthalates including dibutyl phthalate, diphenyl phthalate, dibenzyl phthalate and dicarbitol phthalate, phthalimidoethyl propionate, sebacates such as dibutyl sebacate and dioctyl sebacate, phosphates including tricresyl phosphate and tributoxy ethyl phosphate, naturally occurring and modified oils including castor oil, soya bean oil, cottonseed oil, rapeseed oil, and the various treated oils such as the blown and hydrogenated oils, and alkyd or polyester resins prepared by the condensation and polymerization of polyhydric alcohols including glycerol and ethyl glycol with poly basic acids such as adipic acid, sebactic acid and glutaric acid. The aforegoing examples of plasticizers are merely illustrative of those commonly used in the art that may be employed in the compositions of the present invention.

Waxes or wax-like substances which will impart moisture-proof properties to nitrocellulose coatings include not only the solid naturally occurring waxes such as carnauba wax, candelilla wax, palm wax, and ozokerite but the mineral waxes such as paraffin wax and synthetic waxes, such as the hydrogenated oils, e.g., hydrogenated cottonseed oil. Paraffin wax is used in the examples set forth herein because of its effectiveness.

It is conventional practice in the preparation of nitrocellulose lacquers for coating films to add an ingredient which will increase the compatibility of nitrocellulose and the wax and consequently the transparency of the coating. This ingredient is referred to as a blending agent and is normally resinous in nature. Kopol, a fused Congo copal resin (M.P. 60–75° C.), gum dammar, rosin and modifications thereof are well known as blending agents which are operative in the present invention for wax in nitrocellulose coatings. Ester gum, maleic acid modified ester gum and rosin modified with pentaerythritol are examples of the modified rosin blending agents.

While the styrene-butadiene copolymer is an excellent anti-blocking agent, other known materials which are extremely fine particles in nature and produce minute irregularities in the surface of a coated film, such as bentonite, silica, and talc may also be used with the copolymer and/or tri-2-ethylhexyl phosphate.

The film-forming composition comprising nitrocellulose, a wax, a blending agent and a plasticizer is dissolved in a combination of organic liquids to make up a lacquer comprising from about 8% to about 20% by weight of solids. The coating composition is then applied to cellulosic pellicles by spraying the lacquer thereon, dipping the pellicle in the lacquer or by any other conventional means in the art. The solvent mixture comprises from about 25% to 50% by weight of a solvent for nitrocellulose such as ethyl acetate or butyl acetate, from 5% to 20% of an alcohol such as ethyl alcohol and/or butyl alcohol and from about 40% to about 60% by weight of benzene, xylene, or toluene.

The moistureproof nitrocellulose coatings described above are applied in relatively thin films, i.e., from about 0.05 mil to about 0.2 mil, to films and sheets of cellulosic materials such as regenerated cellulose and hygroscopic lower aliphatic ethers of cellulose including hydroxyethyl cellulose, carboxymethyl cellulose and ethyl cellulose. These coated films have a thickness of from 1 mil to 3 mils and a preferred thickness of the order of 1 mil where the coated pellicles are to be used as transparent heat-sealable packaging tissue.

The following examples are illustrative of the invention and represent preferred embodiments thereof. All parts and percentages set forth therein are by weight. To demonstrate the relative properties of the examples and controls, all compositions were applied to one side only of a regenerated cellulose film having a thickness of about 1 mil from a lacquer containing from 8% to 10% solids and a solvent mixture consisting of butyl acetate ethanol, butanol and toluene. The heat sealing properties were observed by pressing together two layers of coated films between two metallic surfaces which were heated to a temperature of about 265° F.

*Example 1*

A composition consisting of the following ingredients, thoroughly admixed, was formulated:

| | Parts |
|---|---|
| 5–6 second nitrocellulose | 48 |
| Phthalimidoethyl propionate | 35 |
| Dibutyl phthalate | 5 |
| Kopol, a fused Congo copal resin (M.P. 60–75° C.) | 6 |
| Paraffin wax (melting point 150° F.) | 4 |
| Bentonite | 2 |
| Styrene-Butadiene copolymer (85% styrene) | 1 |

The above composition was dissolved in a solvent mixture described hereinabove and applied to the regenerated cellulose film. All components of the film were compatible as formulated and the coated sheet was readily heat sealable at 265° F. The heat sealed layers readily released from the heated surfaces of the heat sealing apparatus.

A composition the same as above, except that the styrenebutadiene copolymer was omitted, was formulated and applied to a regenerated cellulose film. The heat sealing properties of this control film were less desirable than the above composition which included the styrene butadiene copolymer. These coated sheets also did not as readily release from the heat sealing surfaces.

*Example 2*

The following composition was formulated and applied to regenerated cellulose film as in Example 1:

| | Parts |
|---|---|
| 5–6 second nitrocellulose | 32 |
| ½ second nitrocellulose | 16 |
| Phthalimidoethyl propionate | 20 |
| Tri-2-ethylhexyl phosphate | 6 |
| Di-cyclohexyl phthalate | 14 |
| Paraffin wax (melting point 150° F.) | 5 |
| Maleic acid modified ester gum | 4 |
| Polyester of adipic acid and ethylene glycol | 1 |
| Bentonite | 1 |
| Styrene-butadiene copolymer | 1 |

An excellent heat seal was effected with dual layers of the coated film. An excellent release from the heat sealing surfaces was also observed. Multiple layers of the coated sheets exhibited no tendency to block when 10 coated sheets 4 x 4" were stacked together and a pressure of ⅓ pound per square inch was applied to the stack as it was heated in an oven at 115° F. for 16 hours.

*Example 3*

The same composition as in Example 2 was formulated except that the styrene-butadiene copolymer was omitted and 2 parts of bentonite employed. The coated films exhibited the same excellent heat seal and release from heat sealing surfaces as the coating in Example 2. A slight blocking was observed, however, when the coated sheets were tested for blocking in the same manner as those in Example 2.

As a comparison for both Examples 2 and 3 the composition of Example 2 was made up substituting dibutyl phthalate for the tri-2-ethylhexyl phosphate and omitting the styrene-butadiene copolymer. Regenerated cellulose films coated with this composition also gave an excellent heat seal but only fair release from the heat sealing surfaces. A moderate blocking effect was noted when multiple layers of the coated film were superimposed under the conditions set forth in Example 2.

*Example 4*

| | Parts |
|---|---|
| 5–6 second nitrocellulose | 50 |
| Phthalimidoethyl propionate | 24.5 |
| Tri-2-ethylhexyl phosphate | 7 |
| Maleic acid modified ester gum | 2 |
| Tri-p-tert-butylphenyl phosphate | 10 |
| Paraffin wax (melting point 150° F.) | 4 |
| Bentonite | 2.5 |

The above composition was dissolved in the solvent and applied to regenerated cellulose film as specified hereinabove. The coated film was heat sealed at 265° F. to form an excellent heat seal which readily released from the heat sealing surfaces.

The same formulation in this example was prepared substituting 7 parts of dibutyl phthalate for the tri-2-ethylhexyl phosphate. Films coated with this composition also formed excellent heat seals but the release from the heat sealing surfaces was only fair to good.

*Example 5*

A composition containing the following materials was prepared and applied to regenerated cellulose films as described hereinabove:

| | Parts |
|---|---|
| 5–6 second nitrocellulose | 50 |
| Paraffin wax (melting point 150° F.) | 6 |
| High molecular weight polyester of adipic acid and ethylene glycol | 20 |
| Tri-2-ethylhexyl phosphate | 5 |
| Maleic acid modified ester gum | 18 |
| Bentonite | 2 |

Samples of this coated film were tested for water vapor transmission rate in the General Foods Cabinet (see article entitled "Moisture Vapor Test Cabinet" on page 78 of Modern Packaging, vol. 16, November 1942) and the rate found to be 3.8 g. per 24 hours per square meter.

As a comparison the above composition was changed by substituting 5 parts of a low molecular weight adipic acid-ethylene glycol polyester for tri-2-ethylhexyl phosphate. These coated films tested under the same conditions had a moisture vapor transmission rate of 5.4 g. per 24 hours per square meter.

*Example 6*

A composition containing the following was prepared:

| | Parts |
|---|---|
| 5–6 second nitrocellulose | 35 |
| Paraffin wax (melting point 150° F.) | 5.5 |
| Tri-2-ethylhexyl phosphate | 4 |
| Phthalimidoethyl propionate | 15 |
| Bentonite | 1 |
| ½ second nitrocellulose | 23 |
| Maleic anhydride pentaerythritol modified rosin | 16.5 |

The composition was dissolved and applied to a regenerated cellulose film as described hereinabove. The water vapor transmission rate per 24 hours per square meter was observed to be 5.0 g.

A comparison wherein 4 parts of dibutyl phthalate were substituted for tri-2-ethylhexyl phosphate in the above composition was dissolved and applied to a regenerated cellulose film in the same manner. The water vapor transmission rate per 24 hours per square meter at 100° F. was observed to be 7.8 g.

*Example 7*

A coating composition was prepared of the following materials:

| | Parts |
|---|---|
| 5–6 second nitrocellulose | 35 |
| ½ second nitrocellulose | 23 |
| Paraffin wax (melting point 150° F.) | 6 |
| Bentonite | 1 |
| Phthalimidoethyl propionate | 11 |
| Tri-2-ethylhexyl phosphate | 4 |
| Maleic anhydride modified rosin | 4 |
| Ester gum | 16 |

The above composition was dissolved and applied to a regenerated cellulose film as set forth hereinabove. The water vapor transmission rate per 24 hours per square meter at 100° F. was 6.8 g.

A comparison test was made on the above composition. The test composition contained 4 parts of dimethyl cyclohexyl phthalate instead of tri-2-ethylhexyl phosphate. Regenerated cellulose coated with this composition had a water vapor transmission rate per 24 hours per square meter of 9.7 g. at 100° F.

The foregoing examples demonstrate the superiority of nitrocellulose coatings containing tri-2-ethylhexyl phosphate and/or styrene-butadiene copolymers containing from 80–90% by weight of styrene. The demonstrated advantages in releasability from heat sealing surfaces and anti-blocking when the coatings of the present invention are applied to cellulosic pellicles are indicative of their usefulness in the transparent packaging field.

It was further noted that the compositions herein described adhered firmly to the regenerated cellulose base under normal conditions. If to be used under extreme conditions of humidity, it is preferred to first incorporate an anchoring material in the regenerated cellulose film by a so-called anchor treatment, such as disclosed in Cornwell Patents Nos. 2,575,443 and 2,639,241. A conventional method of effecting the anchor treatment by immersing the film in a solution of dispersion of a heat-hardenable resin and then heating the film preferably in the presence of an acid curing agent may be followed. The moistureproof nitrocellulose composition is then applied as described herein.

Neither the tri-2-ethylhexyl phosphate nor the styrene-butadiene copolymer had and observable effect on the transparency of the coatings wherein they were incorporated. All of the coatings described in the examples were highly transparent and glossy.

I claim:
1. A method of reducing blocking on a regenerated cellulose film coated with nitrocellulose comprising coating regenerated cellulose with a nitrocellulose lacquer containing an anti-blocking agent comprising about 0.2 to about 2% by weight of lacquer solids of a styrene-butadiene copolymer which is predominantly styrene.

2. The method of claim 1 wherein said anti-blocking agent is a copolymer containing between about 80 and 90 parts by weight styrene and about 10 to 20 parts by weight butadiene.

3. In a process for coating regenerated cellulose film with a nitrocellulose lacquer, the improvement comprising the inclusion in said lacquer of an anti-blocking agent about 80 to 90% by weight of styrene in a quantity of from about 0.2 to about 2% by weight of lacquer solids.

4. As a novel composition of matter a regenerated cellulose film coated with a nitrocellulose lacquer coating containing as an anti-blocking agent a butadiene-styrene copolymer in an amount of about 0.2–2% by weight of the coating, said butadiene-styrene copolymer being one wherein said styrene is the predominant component thereof.

5. Composition of claim 4 wherein the anti-blocking agent is a copolymer of 80–90 parts by weight styrene to 10–20 parts by weight butadiene.

6. In a regenerated cellulose sheet coated with a moistureproof nitrocellulose coating the improvement which comprises the inclusion of about 0.2–2% by weight of a butadienestyrene copolymer containing from 80–90% by weight of styrene as an anti-blocking agent.

References Cited in the file of this patent

UNITED STATES PATENTS

| 1,997,105 | Cornwell | Apr. 9, 1935 |
| 2,273,880 | Mitchell | Feb. 24, 1942 |
| 2,477,316 | Sparks et al. | July 26, 1949 |
| 2,523,868 | Ellis | Sept. 26, 1950 |
| 2,533,557 | Chapman | Dec. 12, 1950 |
| 2,770,555 | Cornwell | Nov. 13, 1956 |

OTHER REFERENCES

Buttrey: "Plasticizers," page 30, published by Cleaver-Hume Press Ltd., London, 1950.

UNITED STATES PATENT OFFICE
CERTIFICATE OF CORRECTION

Patent No. 2,888,368                                                             May 26, 1959

William G. Grantham

It is hereby certified that error appears in the printed specification of the above numbered patent requiring correction and that the said Letters Patent should read as corrected below.

Column 1, line 44, for "heated", first occurrence, read -- heat --; column 5, line 49, for "had and" read -- had any --; column 6, line 17, after "agent" insert -- comprising a styrene-butadiene copolymer containing --.

Signed and sealed this 6th day of October 1959.

(SEAL)
Attest:

KARL H. AXLINE                                                  ROBERT C. WATSON
Attesting Officer                                             Commissioner of Patents